United States Patent [19]

Katayama

[11] Patent Number: 5,294,978
[45] Date of Patent: Mar. 15, 1994

[54] VISUALIZATION TECHNIQUES FOR TEMPORALLY ACQUIRED SEQUENCES OF IMAGES

[75] Inventor: Andrew S. Katayama, Cardiff by the Sea, Calif.

[73] Assignee: Eastman Kodak Company, Rochester, N.Y.

[21] Appl. No.: 809,190

[22] Filed: Dec. 17, 1991

[51] Int. Cl.5 .................. H04N 7/18; H04N 5/262
[52] U.S. Cl. .................................................. 348/416
[58] Field of Search .................. 358/105, 125, 182, 93, 358/108, 183, 209; H04N 5/262, 5/272, 7/18

[56] References Cited

U.S. PATENT DOCUMENTS

| | | | |
|---|---|---|---|
| 4,025,718 | 5/1977 | Paretti | 358/105 X |
| 4,214,263 | 7/1980 | Kaiser | 358/105 X |
| 4,322,752 | 3/1982 | Bixby | 358/213 |
| 4,496,995 | 1/1985 | Colles et al. | 360/9.1 |
| 4,713,686 | 12/1987 | Ozaki et al. | 358/105 X |
| 4,713,693 | 12/1987 | Southworth et al. | 358/22 X |
| 4,791,490 | 12/1988 | Knight et al. | 358/209 |
| 4,843,483 | 6/1989 | Bogner | 358/22 X |
| 4,893,182 | 1/1990 | Gautraud et al. | 358/105 |
| 4,980,762 | 12/1990 | Heeger et al. | 358/93 |
| 5,101,364 | 3/1992 | Davenport et al. | 395/152 |
| 5,111,410 | 5/1992 | Nakayama et al. | 358/105 X |

OTHER PUBLICATIONS

Advanced Imaging, Aug. 1992, cover page, pp. 22–25, 56.

Primary Examiner—Victor R. Kostak
Attorney, Agent, or Firm—William F. Noval

[57] ABSTRACT

A motion analysis system records a sequence of image frames of an event at a fast frame rate. A 2-D or 3-D still image depicting the kinetics of the multiple recorded, images is constructed by spatio-temporal visualization techniques. In the spatio-temporal (ST)-2-D technique, a path of pixels is defined showing travel of an object over time. The path of pixels of each image frame is represented in the ST-2-D image as a horizontal line of pixels. Each line in the vertical or horizontal direction is taken from one frame so that the sequence of lines represents the sequence of image frames of the event. In the ST-3-D visualization technique, a closed curve path of pixels is defined and represented in the ST-3-D image using 3-D graphical display techniques.

7 Claims, 8 Drawing Sheets

TIME

DISTANCE ALONG DEFINED PATH

PROCEDURE TO FIND
ORTHOGONAL PROJECTIONS

VISUALIZATION TECHNIQUES FOR TEMPORALLY ACQUIRED SEQUENCES OF IMAGES

BACKGROUND OF THE INVENTION

This invention relates in general to a motion analysis system which records a sequence of images of an event at a fast frame rate and plays back the images of the event at a slower frame rate so that the event may be analyzed. More particularly, this invention relates to visualization techniques for temporally acquired sequences of images which allow the visualization in one still image of the kinetics of a multiple image recording session.

Motion analysis systems are useful for analyzing rapidly changing events. One type of motion analysis system records a great number of images during an event at a high or fast image frame rate and reproduces the image frames more slowly at a lower frame rate. Thus, any movement occurring during the event may be analyzed in a step by step progression. Applications for a motion analysis system include, malfunctions in high speed machinery, movements of an athlete, testing of safety equipment, shattering of an object, etc. One type of motion analysis system is disclosed in commonly assigned U.S. Pat. No. 4,496,995 issued Jan. 29, 1985. As disclosed in the latter patent, the motion analysis system/fast frame recorder includes a video camera, a variable speed processor and a video display monitor. The camera is read out in block format so that, a plurality of lines of video information that correspond to rows of photosites in the camera solid state imager, are simultaneously recorded on magnetic tape in parallel longitudinal tracks. During playback, the magnetic tape is played back at a reduced tape speed. A plurality of parallel video signals reproduced from parallel tracks on the tape are processed into a serial video signal which may be used with standard video monitors. A magnetic tape motion analysis system is advantageous, because of he ability to record a large number of image frames and because of the nonvolatility of the image storage.

Another type of motion analysis system is disclosed in commonly assigned patent application Ser. No. 07/431,010 filing date Nov. 2, 1989. As disclosed in this patent, the motion analysis system includes a video camera, a solid state memory, a video processor, and a video display monitor. A sequence of images of an event is stored in digital format in the solid state memory. Stored frames are played back in a sequence of full frames. Alternatively, individual images are randomly accessed for display either as individual frames or in any sequence of frames desired.

There are applications where it would be desirable to visualize in a single still image the kinetics of a portion of or the entire sequence of images of a recorded or stored event.

SUMMARY OF THE INVENTION

According to the present invention, there is provided visualization techniques of displaying temporally acquired images of an event. Preferably the images are produced by a fast frame recording process. According to a feature of the present invention, there is provided a technique for displaying in one still image the kinetics of a portion of or all of the images of a recorded event.

According to an aspect of the present invention, a visualization technique is provided for displaying one or more objects with one degree of freedom (i.e., the objects displayed are constrained to travel along the same path which may or may not be straight) versus time.

DESCRIPTION OF THE DRAWINGS

In a detailed description of a preferred embodiment of the invention presented below, reference is made to the accompanied drawings, in which like numerals refer to like elements.

DESCRIPTION OF THE PREFERRED EMBODIMENT

Figure 1:
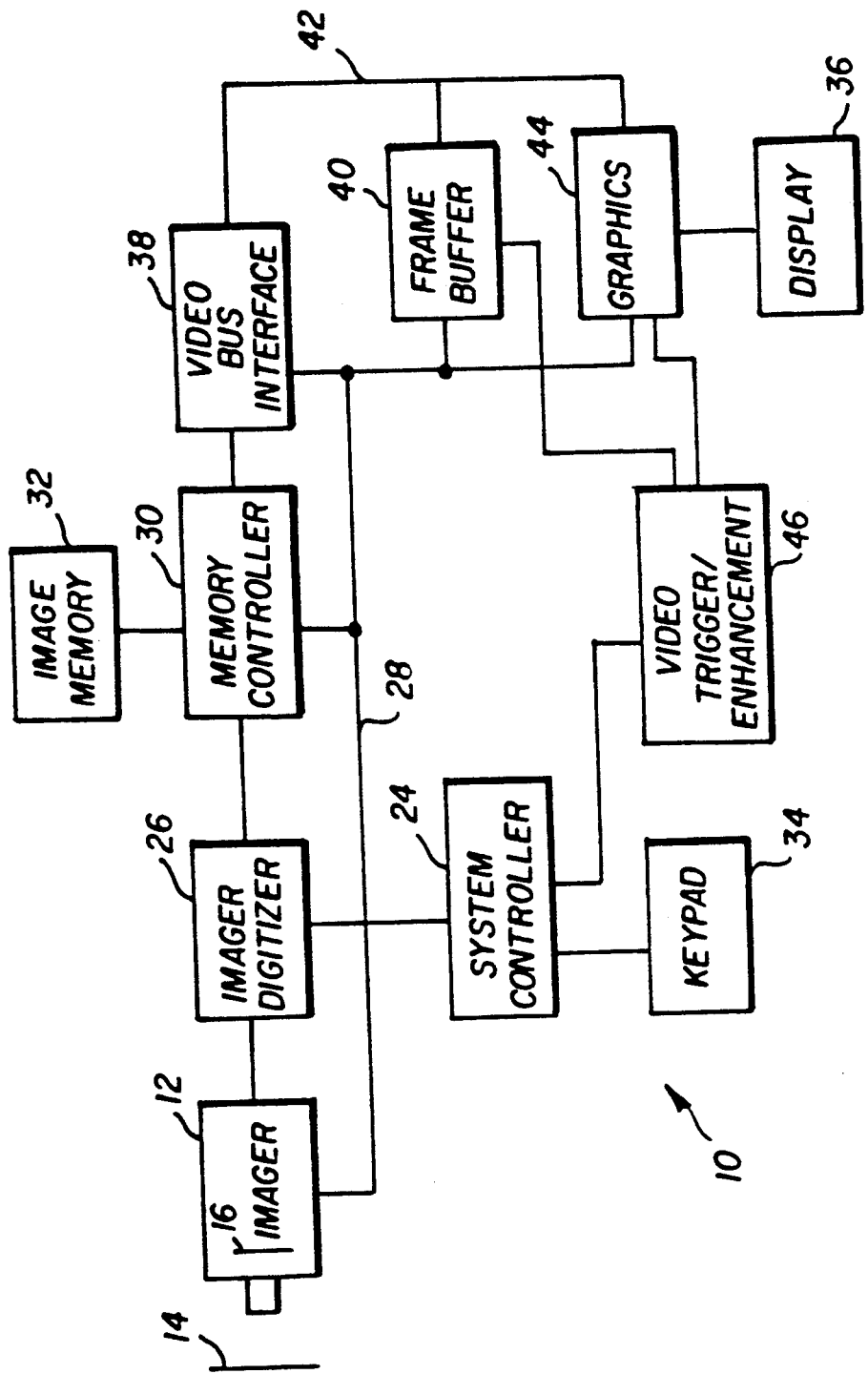
FIG. 1 is a block diagram of a preferred embodiment of the solid state motion analysis system of the present invention.

Referring now to FIG. 1, there will be described a motion analysis system incorporating an embodiment of the present invention. As shown in FIG. 1, motion analysis system 10 includes solid state imager 12 which images an event such as scene 14 by means of a solid state area image sensor 16. Imager 12 is controlled by system controller 24. Controller 24 supplies suitable timing and control signals to imager 12 over bus 28 as a function of operator selectable parameters, such as frame rate and exposure time, among others. Imager 12 may operate for example at frame rates of 1 to 1,000 frames per second.

Figure 2:
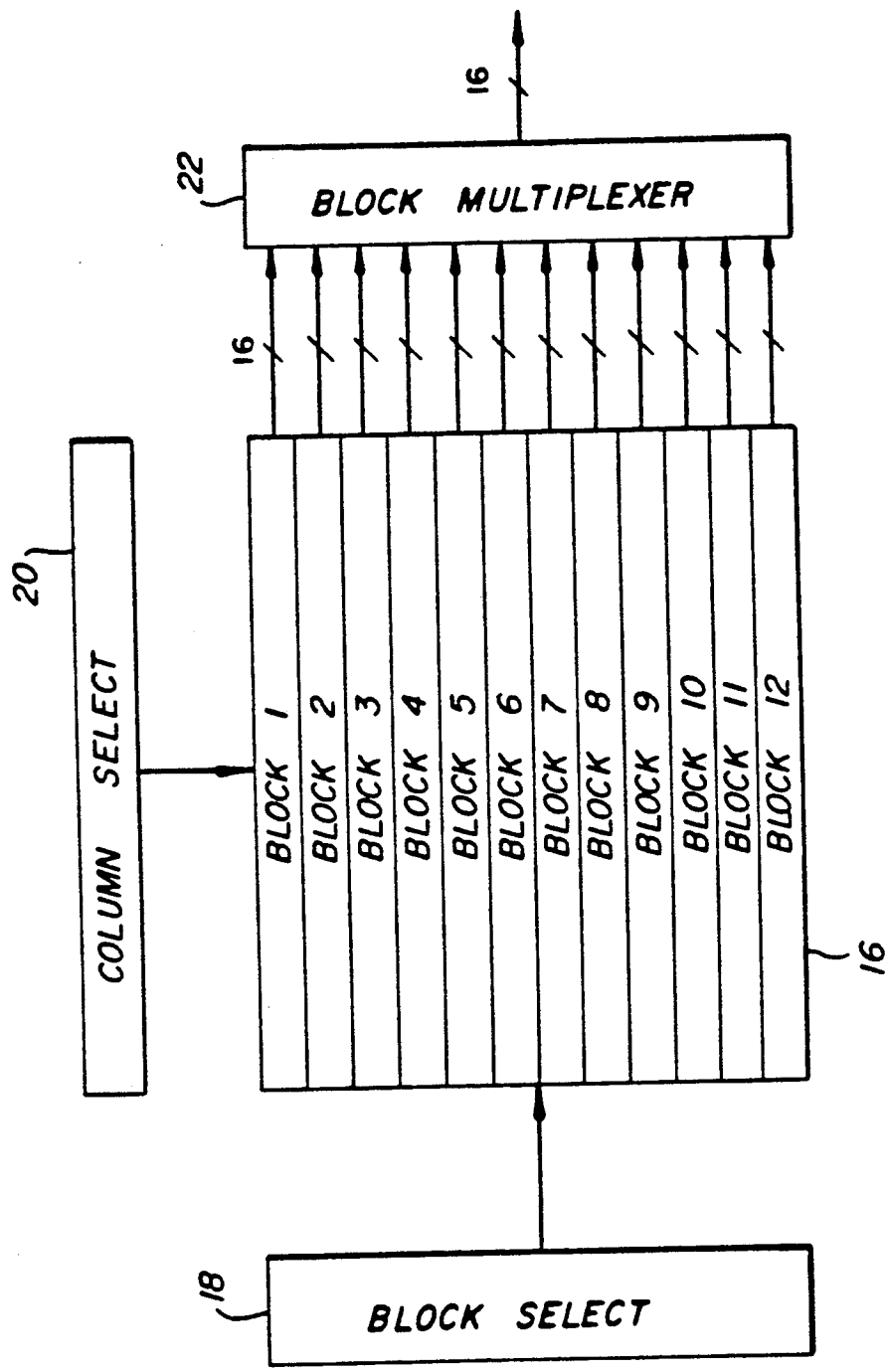
FIG. 2 is a functional block schematic diagram of a block readable image sensor.

Image sensor 16 is preferably a block readable area image sensor. The basic concept of a block readout of a solid state area image sensor and the timing and control thereof is disclosed in U.S. Pat. No. 4,322,752 in the name of James A. Bixby. Although the referenced patent provides detailed information, a brief description of the concept of block readout may be illustrated with respect to FIG. 2. FIG. 2 shows an area image sensor 16 that includes an array of photosites (not individually shown) arranged in rows and columns. For example, sensor 16 may include an array of 192 rows of 256 photosites in each row. Each photosite represents a picture element (pixel) of an image projected onto sensor 16. For purposes of readout, sensor 16 is schematically shown as being formatted into 12 blocks of 16 photosite rows in each block. Through appropriate control circuitry, including block select circuit 18 and column select circuit 20, blocks 1 to 12 of sensor 16 are sequentially readout as parallel rows of photosites to block multiplexer circuit 22. Multiplexer 22 produces an image frame signal which includes 12 sequential blocks of video information wherein each block of video information includes 16 parallel lines of analog video signals Each line of video information includes 256 pixels of variable image characteristics such as luminance, color, etc.

The parallel lines of analog video signals from imager 12 are supplied to imager digitizer 26. Imager digitizer 26 amplifies and conditions the parallel analog signals for preparation to be digitized. Digitizer 26 includes an analog to digital converter on each parallel signal line in order to convert each analog signal into a digital signal. Each analog-to-digital converter will output a digital signal having a digital value of a predetermined number of bits, such as eight. Digitizer 26 takes the bit information from each analog-to-digital converter and converts the information into a bit serial format on an output line. Thus, in this example, after serialization, there are the same number of parallel digital signal lines which are output from image digitizer 26 as the number of parallel analog signal lines which are input to digitizer 26. System control 24 supplies control and timing signals to digitizer 26 over control and timing bus 28.

External data signals from a source (not shown) may be temporally associated with an image frame by interleaving the external data with the image data in digitizer 26. Memory controller 30 receives the parallel lines of serialized digital information from digitizer 26 and stores it in image memory 32. Memory 32 is made up of a number of solid state random access memory devices, such as DRAMS or SRAMS. Inherently, to store information in a random access memory, a location needs to be addressed and then the information written to their input port. Memory controller 30 is used to give order to the random access capability of the solid state memory. When recording, controller 30 generates the address signals to the RAM in a known fixed sequential format.

Motion analysis system 10 may be operated in several recording modes. In one recording mode, once image memory 32 is full up, no more images from imager 12 are stored in memory 32. In another recording mode, the storing of image frames in memory 32 is circular so that once memory 32 is full (i.e. cannot store another image frame in a unique location) the newest image frame is recorded over the oldest image frame. In this manner, image frames from imager 12 are continuously recorded in memory 32 over older images frames until a stop signal is applied by system controller 24. This stop signal may be the result of a signal generated by the operator from keypad 34 or by a trigger signal.

Figure 3:
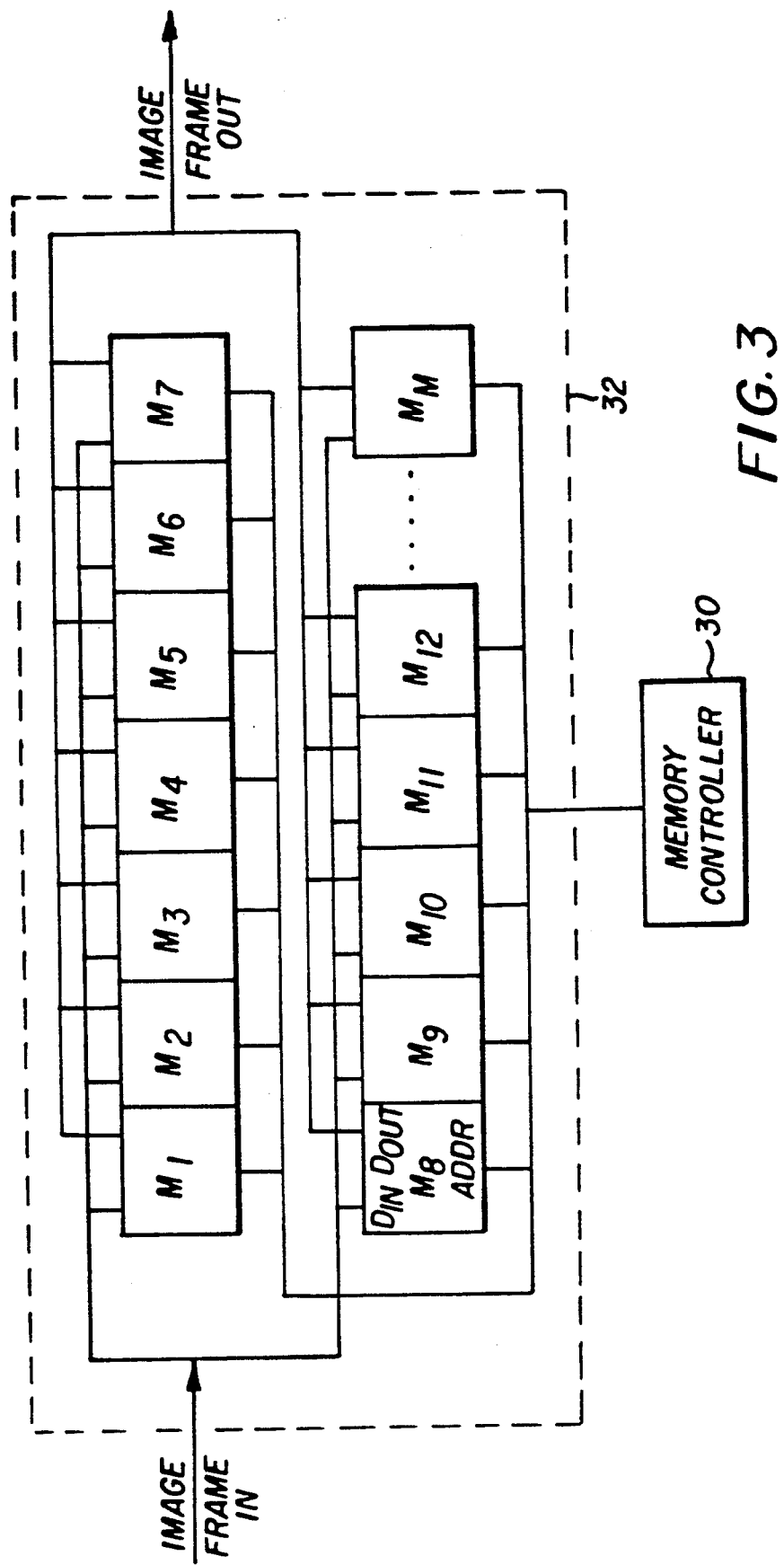
FIG. 3 is a functional block schematic diagram of the solid state memory of the embodiment of FIG. 1.

Memory 32 may have a storage capacity of any size but should be large enough to store a sufficient number of image frames to capture an event in totality for later analysis. As shown in FIG. 3, memory 32 includes M image frame locations numbered M to $M_m$. As an example, if an image frame plus external data information forms a display matrix of 256×256 pixels and each pixel is represented by 8 bits of information, each image frame stored in memory 32 occupies approximately 65 kilobytes of memory. If 1,000 image frames are to be stored, then memory 32 must have approximately 65 megabytes of solid state memory storage.

Image frames stored, in memory 32 are displayed on display device 36. Memory controller 30 receives the serialized parallel digital information of an image frame from image memory 32 and supplies it to video bus interface 38. Interface 38 reformats the digital video received from memory 32 via controller 30 and stores it in frame buffer 40 by way of video bus 42. The video bus interface 38 also receives header data relating to each image frame, deinterleaves the header information and stores it in a reserved section of each frame stored in frame buffer 40. Frame buffer 40 has the capacity to store several frames of video data.

The digital video stored in frame buffer 40 is supplied to graphics module 44 by way of video bus 42. Graphics module 44 sums data border information with the video information and converts the digital signal to an analog signal which is displayed on display device 36.

Motion analysis system 10 includes a video trigger circuit 46. Video trigger circuit 46 alters the mode of operation of motion analysis system 10 when there is a change in an image characteristic between two selected (e.g., successive) image frames. The changed image characteristic may, for example, be a change in the gray scale value of an image frame or a change in the color of an image frame. A change in image characteristic is indicative of a change in a static scene which is being imaged by imager 12, thus identifying an event to be recorded for later analysis. If motion analysis system 10 is in a continuous recording mode, in which new image frames are recorded over old image frames in memory 32, the trigger signal produced by video trigger 46 is used to stop recording. Thus, image frames before and after the triggering event may be stored in the memory 32. The trigger signal produced by video trigger circuit 46 can also be used to start the recording of image frames produced by imager 12.

According to the present invention, there is provided new techniques of displaying temporally acquired two-dimensional 2-D images. The main advantage of these new techniques is that they allow the investigator to visualize in one still image the kinetics of an entire recording session. This is contrary to the traditional approaches of either sequencing through the recorded images in time or the tedious digitization of the images on a frame-by-frame basis.

With these visualization techniques, certain characteristics of the sequence of images of an event are immediately observable. Singular object behaviors such as instantaneous velocities, average velocities, accelerations, etc. are easily observed. Inter-object behaviors as well are readily studied, such as relative velocities, collisions, momentum transfer, etc. Additionally, a related technique also allows one to study the evolution of morphologies in time. These visualization techniques also offer another, more intangible, advantage. Namely, these techniques present the captured images in a way that encourages new insights into the event under study.

Two embodiments of the invention will be described. The first embodiment is for the visualization of one or more objects with one degree of freedom (i.e. the objects under study are constrained to travel along the same path. The path itself can be of arbitrary construction, and is therefore not constrained to straight lines.) versus time, and the second embodiment is for the visualization of one or more closed curves versus time. Each of these techniques serves a unique application area of its own. The former technique is ideally suited for the study of the kinetics of one or more independent bodies or particles, such as in sled testing, car crashes, ballistics, or explosives. The latter technique is ideally suited for morphological studies, such as in flow visualization, flame propagation, atomizers, cellular division, or turbulence.

The collection of these visualization techniques will be referred to as Spatio Temporal (ST) visualization. The former of the two variants referred to above will be ST-2-D, the latter will be ST-3-D. The use of the designators '2-D' and '3-D' will become obvious as these methods are discussed in more detail below.

According to a first embodiment of the present invention, ST-2-D visualization allows the study of one or more distinct objects versus time. The number of objects that can be visualized in one ST-2-D image is a function of the path that these objects travel. Multiple objects can be visualized so long as they move along identical paths. This is not to say, however, that these objects cannot be independently visualized in separate ST-2-D images.

The structure of a ST-2-D image is a spatio-temporal image such that the displacement along a path is shown along one of the image axes, while time is shown along the other. A path is defined in the original sequence of images of an event where the object(s) of interest move. This can be as simple as a straight line or simple geometric shapes which can be parametrically defined, to more complicated constructions such as a point-wise continuous line or cubic splines. In any case, the pixel values (intensities and/or color) along this fixed path are taken and displayed along the spatial axis of the ST-2-D image. The pixels constituting this fixed path may be entered as matrix locations by means of keypad 34. Alternately, a mouse may be used to control a cursor displayed on display 36.

For instance, say the spatial axis is along the horizontal direction of the image, while the temporal axis is vertical. The pixel values along the defined path for a given frame are then 'straightened' and redisplayed in one row of the ST-2-D image. This is done by taking the desired path and by dividing it into N evenly spaced points where N is the display resolution along the spatial (horizontal) axis. These N points along the path are then sampled for the first frame and displayed on the first row of the display. The entire ST-2-D image is then constructed by repeating this procedure with successive frames; the information taken from the same defined path from these successive frames are then placed in contiguous rows of the ST-2-D image.

This composite image will contain both lines and/or vertically 'extruded' areas extending into the temporal axis of the image, each of which can be identified with a specific object in the original session (i.e., sequence of images of an event). The shape of these lines or that of the edges of these areas is what allows the immediate interpretation of the kinetics of each of objects in question. The interpretation of the ST-2-D image will now be described.

As described above, a ST-2-D image will contain several lines and 'extruded' areas. In the latter case, the edges of these areas are of interest. As such, in the end, there is only interest in lines, whether they be actual lines in the ST-2-D image or the edges of areas. Each of these lines corresponds to actual points on one or more objects in the original sequence of images of an event (session). Therefore, it should be noted in the following discussion that when lines in the ST-2-D image are referenced, they represent objects in the original image.

The source of these lines or areas can be related to features in the original session. For instance, a point light source which follows the defined path will result in a line. A uniformly the other hand, result in an 'extruded' area. The left edge of this area on the ST-2-D image represents the leftmost point of the disc which intersected the path, and vice-versa for the right edge of the area.

Because of the correlation that exists between features of the ST-2-D image to actual object features in the original image, one can measure instantaneous velocities. One does this by simply taking lines tangent to features in the ST-2-D image and measuring their slope. The measured slope (a signed number) corresponds directly to the velocity of the observed feature. The magnitude of the slope of these lines represents its speed, and the sign represents its direction. Thus, a straight vertical line represents zero velocity. (It is assumed that the spatial component of the ST image is in the horizontal direction, and the temporal component in the vertical direction.) Larger deviations from a vertical line indicate successive increases in speed.

It follows from the previous discussion that all straight lines in the ST-2-D image correspond to a constant velocity. Additionally, all quadratics correspond to a constant acceleration or deceleration. Higher order polynomials, of course, describe correspondingly higher order motions.

Referring now to FIGS. 4A–4F, 5A there is shown an example of a recorded session constituting a sequence of image frames of an event and its ST-2-D image. FIGS. 4A–4F show a set of six image frames taken from a hypothetical session; their letter designations A–F represents their order in the original session. They are not, however, taken at equal intervals of time. The original session may include 300 image frames taken at a frame rate of 250 frames per second while only six image frames are shown for illustrative purposes. The session is of a group of 5 balls, each of which is capable of a completely elastic collision. They ride in a fixed track which is approximately bowl shaped.

Figure 4A:
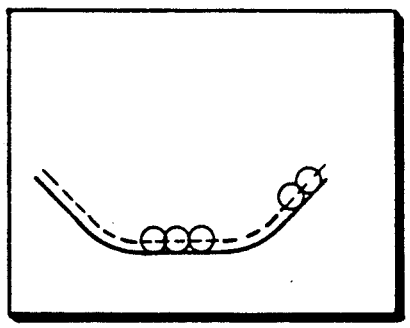
FIG. 4A-4F are diagrammatic views of a sequence of images of an event, which are useful in describing one embodiment of the present invention.
Figure 4B:
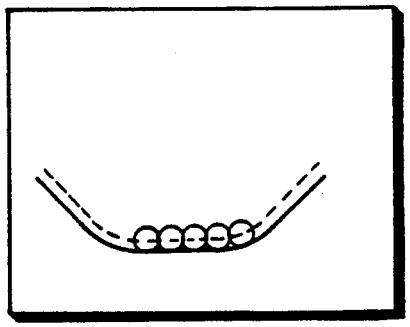
Figure 4C:
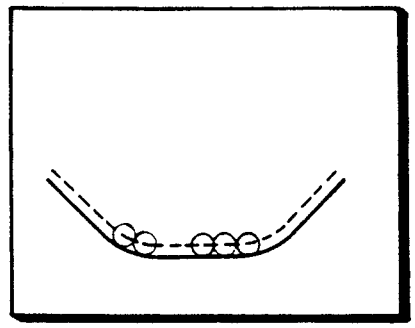
Figure 4D:
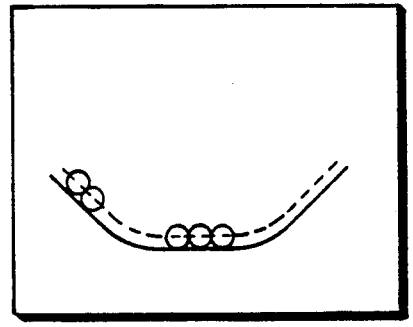
Figure 4E:
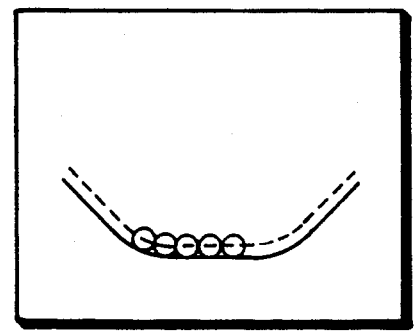
Figure 4F:
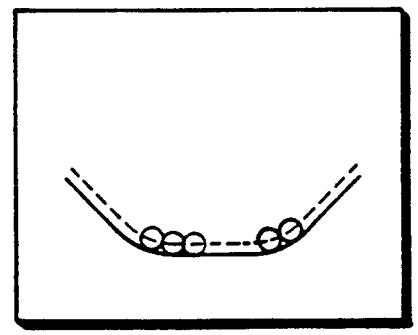

The first image shown in FIG. 4A shows two of the balls just as they have reached the apex of their travel up the right side of the track. All following images in FIGS. 4B–4F show the system of five balls in subsequent states.

For this example, a path of pixels was defined as shown by the dashed line. This intersects the balls through their midpoint, regardless of their position on the track. Note that this path is not part of the original image, but was created later in a system designed for ST visualization.

Figure 5A:
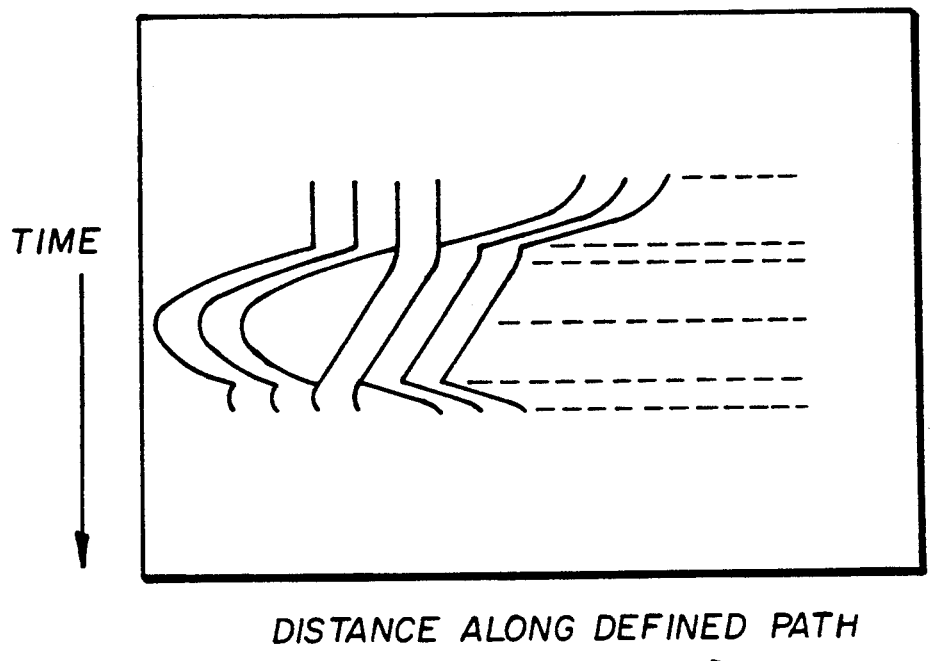
FIG. 5A is a diagrammatic view of a single image spatio-temporal 2-D display of a sequence of images of an event, including the images shown in FIGS. 4A-4F.

As for the display of the ST-2-D image shown in FIG. 5A, the horizontal axis was chosen for the spatial dimension (displacement along the length of the defined path), while the vertical dimension represents time. Note the letters A–F on this image. The letters are there to help relate the pictures A–F of FIGS. 4A–4F with specific lines of the ST-2-D image of FIG. 5A. We will study the interpretation of the ST-2-D image a section at a time, starting from section A–B. The ST-2-D image of FIG. 5A was constructed in Frame 40 by reading the group of pixels defined by the path for each image frame depicted in FIG. 5A. For example, if the displayed ST image is a matrix of 256 pixels by 192 pixels, the defined path can be up to 256 pixels in length and up to 192 sequential image frames can be displayed.

Section A-B of FIG. 5A

We can infer from FIG. 5A a group of three balls are on the left, and a group of two balls on the right, with no interstitial space within a group. This can be seen by the three lines at the right and the four lines at the left.

We also see that during this time, the balls of the left group have zero relative velocity (the four lines are all parallel to each other) and that they have zero velocity (each of the four lines are vertical). Similarly, we also see that the group on the right has zero relative velocity. We also know that the group on the right at point A has reached the apex point of its travel on the track, as the three lines at line A in the ST-2-D image all have a tangent which is vertical, representing a zero instantaneous velocity. By taking three points on one of these lines within section A-B, we can find the acceleration (The terms acceleration and deceleration used in this description correspond to the vernacular use of these terms. Thus, acceleration corresponds to an increase in the magnitude of the velocity (its speed), and deceleration corresponds to its decrease. This is in contrast with the technically correct use of these terms where accelerations and decelerations are vector quantities.) of this group of balls. (If we feel that the acceleration is not constant, we only need to take more points.)

Section B-C of FIG. 5A

We can see that at line B, all five balls have made contact. This can be seen by the merging of two of the lines, one of which represented the right edge of the rightmost ball of the left group, and the other which represented the left edge of the leftmost ball of the right group. We see that there has also been a perfect transfer of momentum of the two balls on the right to the two balls on the left through the middle ball. This can be inferred from the following:

A. The middle ball's track in the ST image remains vertical, implying that no momentum transfer occurred to the middle ball.

B. The tracks of the right pair of balls at line B are vertical, implying that all of its momentum has been given up.

C. The slope of the leftmost pair of balls immediately after line B equals that of the slope of the rightmost pair of balls before line B.

After this momentum transfer at the top of this section, we see that the leftmost pair of balls continues to move at a constant velocity, until it reaches the line C where the leftmost balls start to decelerate due to the ball's movement up the left edge of the track.

We also see that the right group of three balls slowly starts to accelerate until it reaches the end of this section. This is due to the fact that at point B where the balls all made contact, the rightmost ball was still on the sloped portion of the track. However, by point c in the image, all three balls on the right are on the flat portion, and thus they then attain a constant velocity, as is seen in the latter part of the section by the straight parallel lines.

Section C-D of FIG. 5A

At the beginning of this section, we see that the rightmost three balls continue their constant velocities, while the leftmost two balls continue their constant deceleration due to the influence of the left slope of the track. At point D the leftmost balls reaches its apex, as indicated by the tangent to the curves at this point. Since the tangent is vertical, they have an instantaneous velocity of zero.

Section D-E of FIG. 5A

The leftmost balls, after reaching the apex, start to accelerate to the right, while the rightmost balls continue to maintain their constant velocity.

Section E-F of FIG. 5A

At point E, the leftmost two balls makes contact with the rightmost three balls, where another perfect transfer of momentum occurs. This can be seen as the lines representing the left three balls has the same slope after point E as the right three balls had just before point E. Likewise, the lines representing the right two balls after point E have the same slope as the left two balls before point E.

Additionally, we see that after the initial momentum transfer, the right two balls continues at a constant velocity (indicated by the straight lines) until the very end of this section. There, we see the start of the deceleration due to the influence of the right edge of the track. The leftmost three balls are immediately influenced by the left edge of the track, as can be seen in the picture as they accelerate towards the right.

The normal coordinates for a ST-2-D image are composed of two numbers. One number represents the spatial displacement along the defined path, while the second defines the time. However, by defining an orthogonal coordinate system, one can find a one-to-one mapping of each point in the ST-2-D image to a unique point in the original image. (By default, one may also use the original sensor axes.)

Figure 5B:
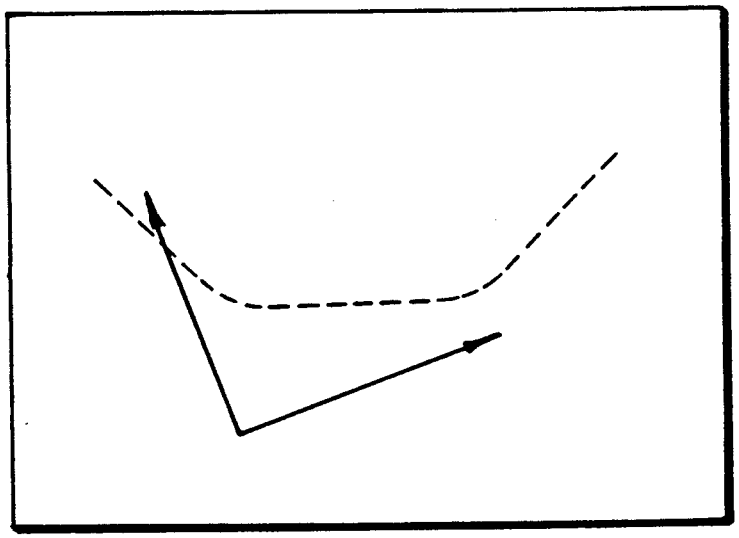
FIG. 5B is a diagrammatic view of a procedure to find orthoganal projections of the images illustrated in FIGS. 4A-4F, and 5A.
Figure 6A:
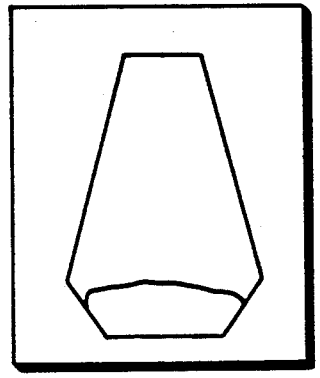
FIGS. 6A-6K are diagrammatic views of a sequence of images of an event, which are useful in describing another embodiment of the present invention.
Figure 6B:
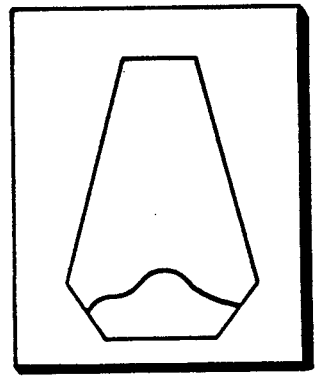
Figure 6C:
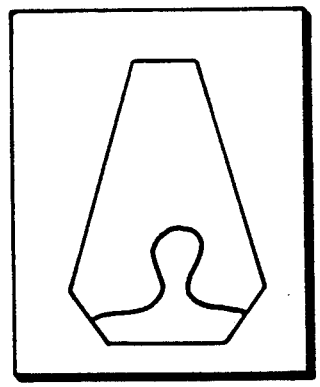
Figure 6D:
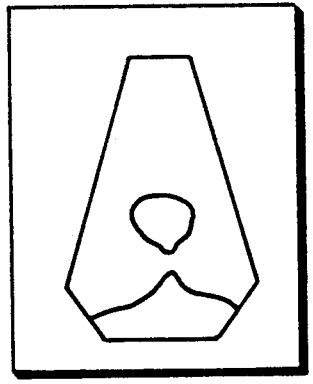
Figure 6E:
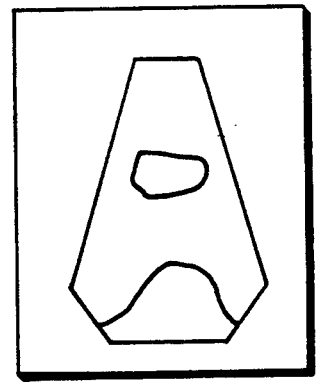
Figure 6F:
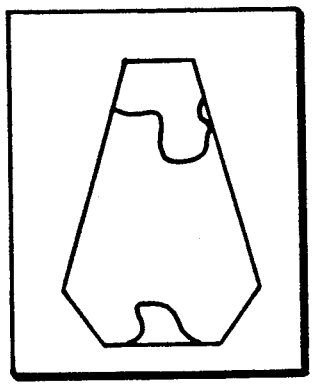
Figure 6G:
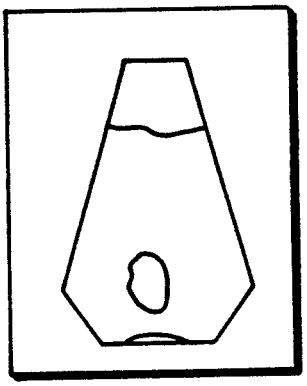
Figure 6H:
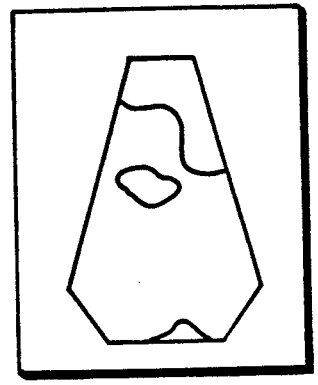
Figure 6I:
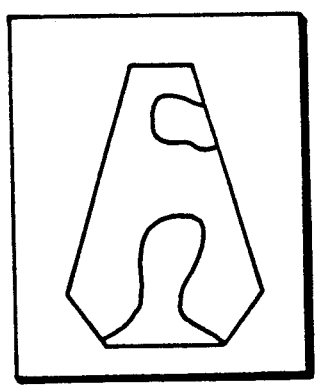
Figure 6J:
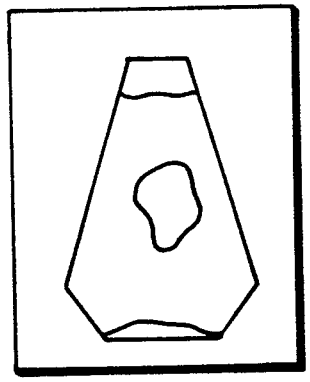
Figure 6K:
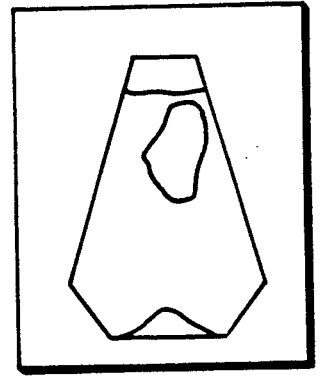

FIG. 5B shows how this can be done. One can simply define a pair of basis vectors (orthogonal axes) in the space of the original image space of arbitrary orientation with respect to the defined path. We see from this picture that there exists a one-to-one correspondence to points on the path and its coordinates with respect to the basis vectors. Thus, we have two ways of displaying a cursor on a ST-2-D image. For a given cursor location on the ST image, we can either display the pair of numbers discussed above, or we can display three numbers, one of which indicates time, while the remaining two numbers indicates the point's location with respect to the defined basis vectors in the original image space.

With the second style of cursor-coordinate display, one can easily calculate linear displacements, velocities, etc. with respect to one of the basis vectors defined in the original image space. However, constant velocities accelerations, etc. with respect to one of the basis vectors will not necessarily be obvious in the ST image. To visualize the nature of projected displacements with respect to one of the basis vectors, one creates one more image which we will call a ST-2-D^2 image.

The ST-2-D^2 image is created by defining a trace in the ST-2-D image corresponding to a visible line or edge of an area. In an otherwise blank screen, we take each point along this trace in the ST-2-D image and redisplay it on the same row of the new display. Its horizontal position along this row is determined by the value of the projected component of this point with respect to the selected basis vector. (Remember that there is a one-to-one correspondence between points on the ST-2-D image to a specific coordinate location in the original image.) For each row to be built, one takes one more pixel from one more row of the ST-2-D image until the last row is placed. The result of this procedure will be a visual image of the object's x or y displacement versus time.

Note that once this procedure has been completed, we have fully defined the object's notion. This information can be easily downloaded for further objective analysis. Alternatively, this path can be redisplayed as a curve in 3-D space, visualized using 3-D display techniques.

The preferred environment to perform the ST-2-D visualization will be in the very environment where the images are normally reviewed. This will allow the investigator to easily 'transform' the images captured depending on how he wishes to view the images. A great deal of synergism can be created in such a hybrid environment, particularly if multiple windows are available. One window can show the traditional display, while the ST-2-D version can be displayed in the other.

With the two windows, the ST-2-D image can be used for purposes beyond those discussed above. Because of a ST-2-D image's ability to describe an entire session, it can be used as a 'table of contents' for the recording. Thus, using known software techniques with a cross-hair cursor in the ST-2-D image space, a click of the mouse button will immediately cause the corresponding frame to be displayed in the first window, with another cross-hair cursor appearing at the point in the original image indicated by the ST 2-D cursor. We therefore will have gained a 'go to frame' function.

For example, for the hypothetical session discussed above, suppose we were intrigued by the slight acceleration to the left of the three balls on the right in section B-C of the ST-2-D image shown in FIG. 5A. By clicking at line B in the ST-2-D image, we will see in the original window that the balls were stacked slightly on the right edge of the bowl, thus causing the acceleration.

Alternatively, we can go in the other direction. By positioning a cursor in the original image space, we can click on a frame to cause the corresponding line in the ST-2-D image to be marked. For instance, in the example given above, we can study the effects of the collision in picture E. By simply clicking on the frame, line E will be marked in the ST-2-D image. By looking at the lines below the marked line, we will instantly see the kinematic effects of the collision viewed in the other window.

In a related mode, we can move a cursor which is restricted to the defined path in the original image space. Clicking on a point on this path will highlight a specific point in the ST-2-D image with a cross-hair cursor.

In the ST-2-D window, certain graphic aids will greatly enhance kinematic measurements. The simplest of these will be the routine display of a cursor location in the ST-2-D image. Two versions of this are possible, each with its own advantages. This has already been described above.

Additionally, two, three, or more point measurements should also be supported. This would involve, the investigator clicking on N points in the ST-2-D image. After N points are entered, a N−1 degree polynomial is fitted. This will provide constant velocity, acceleration, etc. measurements to the investigator.

Another facility which should be supplied is a series of parallel lines. When invoked, they will all be vertical, with a text field indicating that lines in the ST-2-D image parallel to this have zero velocity. By turning a scroll knob, the user can tilt these parallel lines and read the corresponding velocity. By tilting these lines until they are tangent to a line in the D image, the user can measure the instantaneous velocity, acceleration, etc. of an object.

To measure the velocity of an object in the original image space, the investigator can first identify the object by clicking on the point where it crosses the defined path; the corresponding point in the image will be automatically marked with a cross-hair cursor. He then aligns the parallel lines tangent to this point. If on the other hand he has already made the velocity measurement in the ST-2-D image space and wishes to see how the object looks in the original image, he simply clicks with the cross-hair cursor on a point where he took the measurement in the ST-2-D image space. The corresponding point in the original image space will be marked by a cross-hair cursor.

The defined path used in ST visualization is done in the space of the original image. Here, it is helpful to have a fully integrated set of drawing commands, as is found in commonly available 2-D graphics packages. (Such as AutoCad supplied by Autodesk, Inc.) All of these commands ought to be set up such that they allow a pointwise continuous description of the path. They also should allow the continual modification of the path regardless of the underlying image being shown. Although in some cases the entire path can be defined with one image, such as in the example of FIG. 5A, (This is because the expected path of the balls can be completely determined by looking at any of the pictures in the session. As the balls are constrained to ride on the track, and the track is completely visible in the picture, one can construct the path based on one image in the original session. In some cases, such as when studying a projectile in free flight, several frames may need to be referenced to construct a path.) in other cases one may need to refer to several of the original images to construct the path.

According to another embodiment of the invention, ST-3-D visualization allows the study of one or more outlines of objects versus time. Unlike ST-2-D visualization, there is no restriction of the number of objects which can be visualized in one ST-3-D image.

The structure of a ST-3-D image is a 2-D spatial versus temporal image visualized using 3-D graphical techniques. The typical ST-3-D image will contain several distinct closed surfaces, each of which represents one of the object outlines under study. A cross-section of such a surface taken perpendicular to the temporal axis represents the shape of the object at a point in time. As the entire surface is visible, the investigator essentially has available to him the entire history of the object's shape.

A ST-3-D image is constructed by processing the recorded images such that the outlines of the objects under study have been determined. The series of images of the recorded session at this point can be reduced to a series of binary images. Frame-by-frame, each of these outlines are assembled to form a surface visualized using 3-D graphical techniques. Note that to do this does not require the software to correlate the outlines from successive frames to a specific object. The interpretation of a ST-3-D image will now be described.

As described above, a ST-3-D image will contain several closed surfaces. Each of these surfaces corresponds to actual outlines of an object in the original session. Therefore, please keep in mind in the following discussion that when surfaces in the ST-3-D image are referenced, we are also talking about the objects that they represent in the original image.

Because of the correlation that exists between features in the ST-3-D image to actual object shapes in the original image, one can see object interactions or morphological transformations of an object. For instance, a motionless object which does not change its shape will simply appear as if the shape of the object has been extruded parallel to the temporal axis. Likewise, an object which rotates but does not translate or change its shape will appear similar to the extrusion described above, but it will be twisted along the length of the extrusion.

An object which splits, such as a cell undergoing division, will appear as a 'Y' in the ST-3-D visualization, with the arms of the 'Y' pointing towards increasing time. Likewise, two object fusing will appear as a 'Y', but this time the arms will point towards decreasing time.

Figure 7:
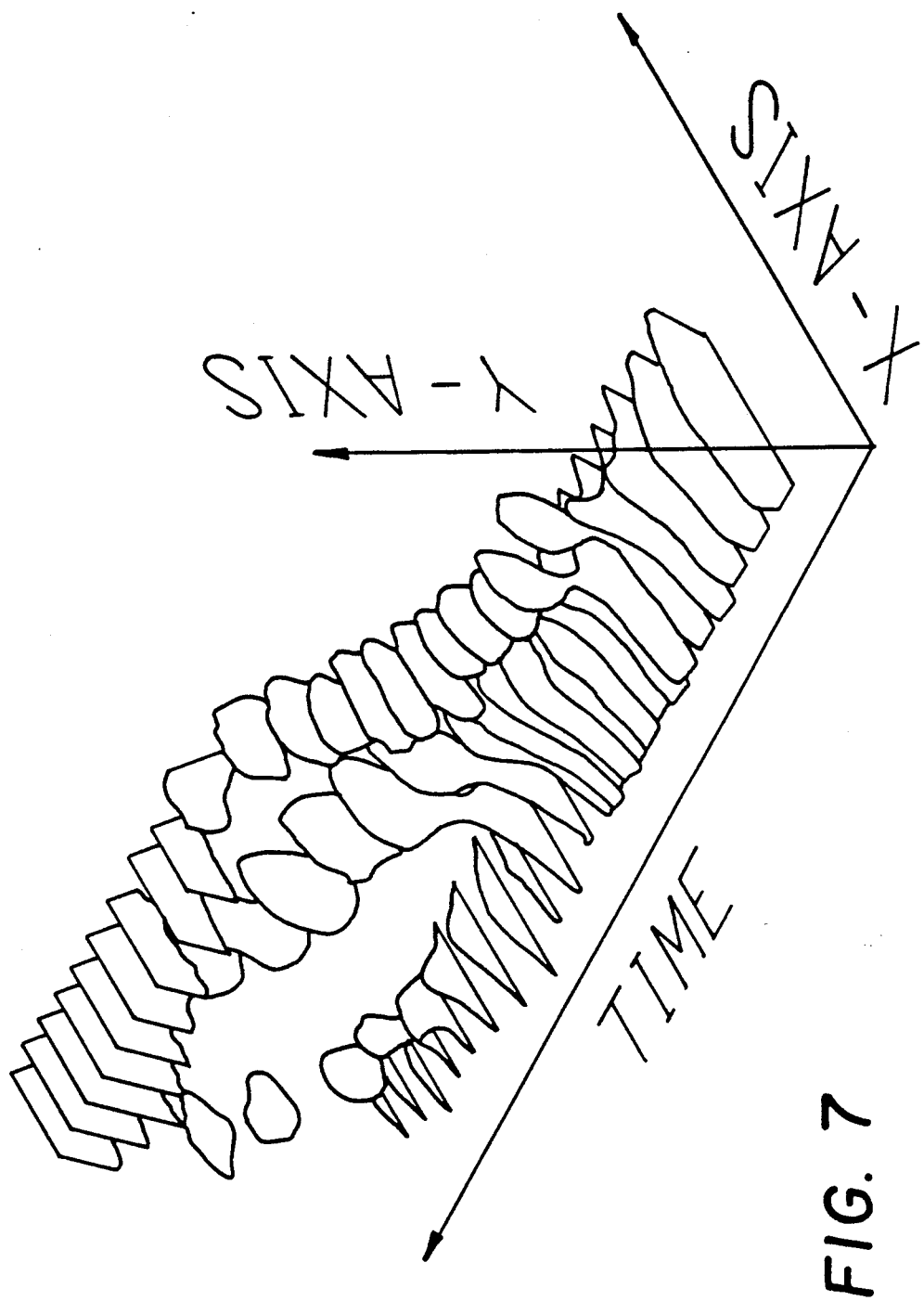
FIG. 7 is a diagrammatic view of a single image spatio-temporal 3-D display of a sequence of images of an event including the images shown in FIGS. 6A-6K.

Referring now to FIGS. 6A-6K, there are shown 11 frames out of a fictitious recording. This session depicts a 'lava lamp'. The ST-3-D image of the same recording session is shown in FIG. 7. The ST-3-D image is not completely filled. In reality, there would be many more frames depicted in the ST-3-D image. In the limit, the cumulative effect would be that of one or more continuous surfaces. Note also that in an actual ST environment, the ST-3-D image can be scaled, rotated, enlarged, etc. to reveal hidden details of the session using graphics software packages, well known to those skilled in the art.

INDUSTRIAL APPLICATION

The invention has industrial application in motion analysis of objects such as rotating machinery, path of a projectile, etc.

Although the invention has been described in detail with particular reference to a preferred embodiment thereof, it will be understood that variations and modifications can be effected within the spirit and scope of the invention as described above and as defined in the appended claims.

What is claimed is:

1. A method for visualizing a sequence of recorded images of an event by a single spatio-temporal image, comprising:
   recording a sequence of image frames of an event;
   defining a series of pixels which is similar for each said recorded image frame; and
   constructing a spatio-temporal image frame having spatial and temporal axes, wherein each said series of pixels of a recorded image frame constitutes at least one line of pixels of said spatio-temporal image frame along the spatial axis, and sequential lines of pixels along the temporal axis are derived from sequential recorded image frames of said event.

2. The method of claim 1, including displaying said spatio-temporal image frame on a video display.

3. The method of claim 1 wherein said defining step includes defining a closed series of pixels of an image frame which is similar for each image frame and wherein said constructing step includes depicting successive closed series of pixels from successive image frames in a three dimensional visualization in a single displayable image frame.

4. A method for visualizing a sequence of recorded images of an event by a single spatio-temporal image, comprising:
   recording a sequence of image frames of an event by imaging an event with a solid sensor at frame rates up to several hundred frames per second and storing said sequence of image frames in solid state memory;
   defining a series of pixels which is similar for each said recorded image frame; and
   constructing a spatio-temporal image frame having spatial and temporal axes, wherein each said series of pixels of a recorded image frame constitutes at least one line of pixels of the image frame along the spatial axis, and wherein sequential lines of pixels along the temporal axis are derived from sequential recorded image frames of said event.

5. The method of claim 4 wherein said recording step includes imaging an event with a solid state sensor which is read out in block format at frame rates up to several hundred frames per second and storing a sequence of images of an event in solid state memory.

6. A method for visualizing a plurality of image frames by a single image frame, comprising the steps of:
   providing a plurality of image frames;
   defining a series of pixels which is similar for each said plurality of image frames; and
   constructing a single displayable image frame, having image axes, wherein each said series of pixels of an image frame constitutes at least one row of pixels of the single displayable image frame along one of said first and second image axes, and wherein sequential rows of pixels along the other of said first and second image axes are derived from other image frames of said plurality of image frames.

7. A method for visualizing a plurality of image frames by a single image frame, comprising the steps of:
   providing a plurality of image frames, each of which includes a matrix of pixels;
   defining a path of pixels which is similar in each of said plurality of image frames;
   displaying the defined path of pixels of an image frame as a row in a displayed image, by dividing the defined path of an image frame into N evenly spaced points, where N is the display resolution along the spatial axis, sampling the N points along the defined path for an image frame and displaying the N points as a row of the display; and
   repeating the displaying step for each of said plurality of image frames to construct a single image frame from contiguous rows of said defined paths of successive image frames.

* * * * *